(12) United States Patent
Creely et al.

(10) Patent No.: US 10,981,521 B2
(45) Date of Patent: Apr. 20, 2021

(54) BRACKETS WITH FOLDING STRAPS FOR SECURING OBJECTS TO MOUNTING SURFACES

(71) Applicant: Michael P. Ziaylek, Yardley, PA (US)

(72) Inventors: Keith R. Creely, Levittown, PA (US); Michael P. Ziaylek, Yardley, PA (US)

(73) Assignee: Michael P. Ziaylek, Yardley, PA (US)

( * ) Notice: Subject to any disclaimer, the term of this patent is extended or adjusted under 35 U.S.C. 154(b) by 0 days.

(21) Appl. No.: 16/379,395

(22) Filed: Apr. 9, 2019

(65) Prior Publication Data
US 2020/0324714 A1   Oct. 15, 2020

(51) Int. Cl.
| | |
|---|---|
| B60R 11/06 | (2006.01) |
| F16B 1/00 | (2006.01) |
| F16B 2/08 | (2006.01) |
| F16M 13/02 | (2006.01) |
| B60R 11/00 | (2006.01) |

(52) U.S. Cl.
CPC .............. *B60R 11/06* (2013.01); *F16B 1/00* (2013.01); *F16B 2/08* (2013.01); *F16M 13/02* (2013.01); *B60R 2011/0036* (2013.01); *B60R 2011/0071* (2013.01); *F16B 2001/0028* (2013.01)

(58) Field of Classification Search
CPC ............ A61M 2209/082; B60R 11/06; B60R 2011/0036; B60R 2011/0071; F16M 13/02; F16B 1/00; F16B 2/08; F16B 2001/0028
See application file for complete search history.

(56) References Cited

U.S. PATENT DOCUMENTS

| | | | | |
|---|---|---|---|---|
| 4,125,240 A | * | 11/1978 | Heard ....................... | G09F 7/18 |
| | | | | 248/218.4 |
| 4,897,768 A | * | 1/1990 | Thul .................... | F16M 11/041 |
| | | | | 362/191 |
| D361,924 S | * | 9/1995 | Becker .......................... | D7/620 |
| 6,015,132 A | * | 1/2000 | Belle ..................... | F16M 13/02 |
| | | | | 248/205.3 |
| 9,615,662 B1 | * | 4/2017 | Amber ...................... | F16B 2/08 |
| 2006/0261019 A1 | * | 11/2006 | Chao ....................... | B62J 11/00 |
| | | | | 211/74 |
| 2013/0334269 A1 | * | 12/2013 | Cardonna .............. | B60R 11/00 |
| | | | | 224/554 |

OTHER PUBLICATIONS

End of the Road, Inc. Quick Fist Clamp—https://www.quickfist.com/index.php/quick-fist-mounts/quick-fist-clamp.html Publicly available prior to Apr. 9, 2019.
End of the Road, Inc. Ratchet Clamp—https://www.quickfist.com/index.php/quick-fist-mounts/quick-fist-ratchet-clamp.html Publicly available prior to Apr. 9, 2019.

(Continued)

*Primary Examiner* — Tan Le
(74) *Attorney, Agent, or Firm* — Fox Rothschild LLP; Robert J. Sacco; Frank T. Carroll

(57) ABSTRACT

Brackets are provided for securing objects to mounting surfaces. The brackets have a foldable strap attached to a base. The base can be mounted on the mounting surface. The strap can extend over the object to be secured, and can be folded back on itself so that fasteners on the strap hold the strap in a folded state in which the strap secures the object to the base.

16 Claims, 11 Drawing Sheets

(56) References Cited

OTHER PUBLICATIONS

Performance Advantage Company Handlelok mounting bracket—http://pactoolmountsredesign.localedgedemosite.com/product/handlelok-1004-2/ Publicly available prior to Apr. 9, 2019.
Performance Advantage Company Jumbo Lok mounting bracket—http://pactoolmountsredesign.localedgedemosite.com/product/jumbolok-1070/ Publicly available prior to Apr. 9, 2019.
Sensible Products Inc. Multi-Rack bracket—https://senpro.net/product/multi-rack/ Publicly available prior to Apr. 9, 2019.

* cited by examiner

__BRACKETS WITH FOLDING STRAPS FOR SECURING OBJECTS TO MOUNTING SURFACES__

BACKGROUND

First responders such as firefighters, paramedics, and emergency response technicians typically carry specialized rescue equipment in their emergency vehicles. For example, many fire engines have one or more equipment compartments used to stow axes; mallets; hoses; hydraulic extrication tools for cutting away portions of damaged vehicles; stabilization and rescue struts for stabilizing vehicles during rescue operations; chains; coiled rope and extension cords, etc. Such equipment needs to be securely stowed within the rescue vehicle. At the same time, however, this life-saving equipment must be readily accessible and easy to retrieve by the first responders due to the time critical nature of firefighting and rescue operations.

Rescue equipment often is mounted on brackets specifically designed for that purpose. These brackets typically include some type of base configured for mounting on a wall, pegboard, or other supporting surface; and a movable restraint configured to secure the item of equipment to the base. In some applications, the restraint is an elastic member having a first end permanently fixed to the base; and a second end that can be attached to, and detached from the base by the user. To secure an object to the bracket, the second end of the elastic member is detached from the base and the elastic member is moved out of the way so that the object can be placed against the base. The elastic member is then moved into a position adjacent to the object; and the second end of the elastic member is secured to the base, which in turn secures the object to the bracket.

The base may be configured to securely receive the second end of the elastic member at a finite number of discrete mating locations on the base. Because the elastic member can only be secured in a finite number of discrete positions, it may not be possible to adequately tighten the elastic member around objects of particular sizes.

To release the object from the bracket, the second end of the elastic member is disengaged from the mating features on the base so that the elastic member can be moved away from the object. Because the elastic member typically is under tension while it is restraining the object, it usually is necessary to stretch the elastic member to disengage the second end of the elastic member from the base. The need to stretch the elastic member can make it difficult for a first responder to retrieve the stowed object in a minimal amount of time and with minimal effort. This difficulty can be exacerbated when the user is wearing heavy gloves such as those typically used by firefighters. Also, repeated stretching of the elastic member can cause the elastic member to permanently stretch over time, potentially reducing its effectiveness at securing a stowed object. In addition, it may be difficult to locate and manipulate the second end of the elastic member in the low-visibility conditions under which firefighters and other first responders often operate.

SUMMARY

In one aspect, the disclosed technology relates to a bracket for securing an object to a mounting surface. The bracket includes a base. The base has a mounting portion configured for mounting on the mounting surface; a first arm attached to the mounting portion; and a second arm attached to the mounting portion. The bracket also includes a strap having a first end attached to the second arm, and a second end. The bracket also has a first fastener attached to a first portion of the strap, and a second fastener attached to a second portion of the strap and configured to mate with the first fastener.

The strap is configured to be placed in a folded state in which the first portion of the strap spans the space between the first and second arms, and the strap wraps around the first arm so that the second portion of the strap folds back, and over the first portion to place the second fastener in contact with the first fastener.

In another aspect, the disclosed technology relates to a method for securing an object to a mounting surface. The method includes providing a bracket. The bracket has a base. The base includes a mounting portion mounted on the mounting surface; a first arm attached to the mounting portion, and a second arm attached to the mounting portion. The bracket also includes a strap having a first end attached to the second arm, and a second end. The bracket also has a first fastener attached to a first portion of the strap; and a second fastener attached to a second portion of the strap and configured to mate with the first fastener.

The method further includes mounting the base on the mounting surface; placing the object between the first and second arms; and moving the strap over the object. The method also includes wrapping the strap around the first arm; and folding the second portion of the strap over the first portion of the strap to bring the first fastener into contact with the second fastener.

In another aspect, the method also can include tightening the strap after wrapping the strap around the first arm by pulling the strap away from the mounting surface.

BRIEF DESCRIPTION OF THE DRAWINGS

The following drawings are illustrative of particular embodiments of the present disclosure and do not limit the scope of the present disclosure. The drawings are not to scale and are intended for use in conjunction with the explanations in the following detailed description. Various non-limiting embodiments will be described in detail with reference to the drawings, wherein like reference numerals represent like parts and assemblies throughout the several views.

DETAILED DESCRIPTION

Figure 1:
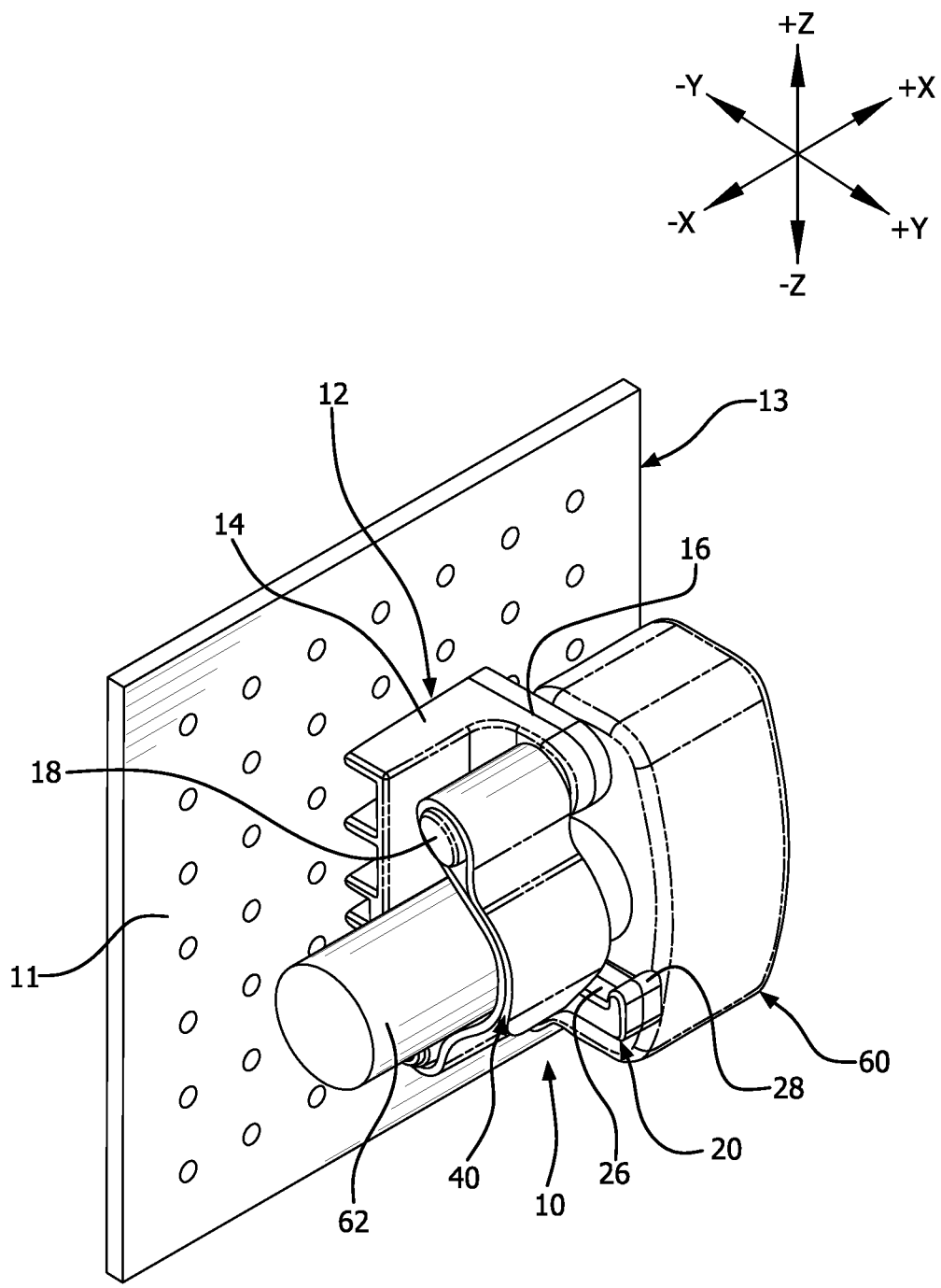
FIG. 1 is a top-left perspective view of a bracket for securing an object to a mounting surface, shown as securing a mallet to a pegboard, and with a strap of the bracket in a folded state.

FIGS. 1-9 depict a bracket 10, and various components thereof. The bracket 10 can be used to hold an object having a handle or other elongated member. These objects can include, for example, axes, mallets, pry bars, hacksaws, etc. The bracket 10 also can be used to hold other types of objects, such as coiled rope, hoses, and extension cords. The bracket 10 can be mounted on a vertically-oriented mounting surface 11, as shown in FIG. 1, so that the bracket 10 has a substantially vertical orientation. The mounting surface 11 can be, for example, an outer surface of a pegboard 13 located within an equipment compartment of a fire truck or other emergency vehicle. Alternatively, the bracket 10 can be suspended from a horizontally-oriented surface (not shown), so that the bracket 10 has a substantially horizontal, downward facing orientation. These particular applications are disclosed for illustrative purposes only. The bracket 10 can be mounted on other types of surfaces, and in other types of vehicles, including but not limited to utility and construction vehicles, pickup trucks, passenger vehicles, etc. Also, the use of the bracket 10 is not limited to moving vehicles. The bracket 10 also can be mounted for use in buildings, houses, garages, workshops, storage sheds, etc.

References to various embodiments and examples set forth in this specification do not limit the scope of the disclosure and merely set forth some of the many possible embodiments of the appended claims. Directional terms such as "upper," "lower," "above," "beneath," etc., unless otherwise noted, are used with reference to the component orientations depicted in FIG. 1. These terms are used for illustrative purposes only, and are not intended to limit the scope of the appended claims.

Figure 2:
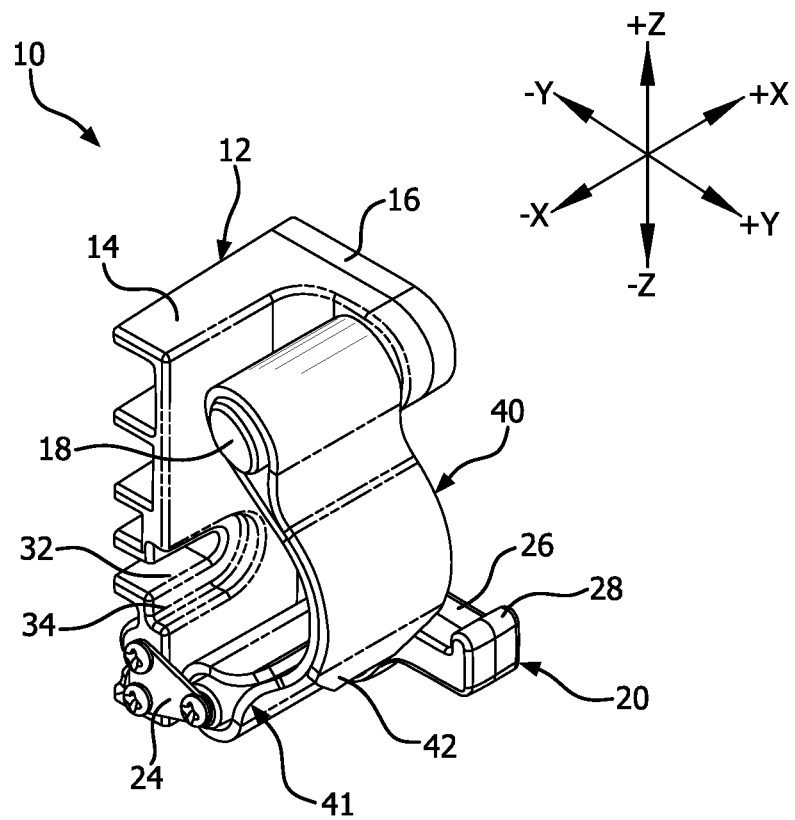
FIG. 2 is top-left perspective view of the bracket shown in FIG. 1, depicting the strap in the folded state.
Figure 3:
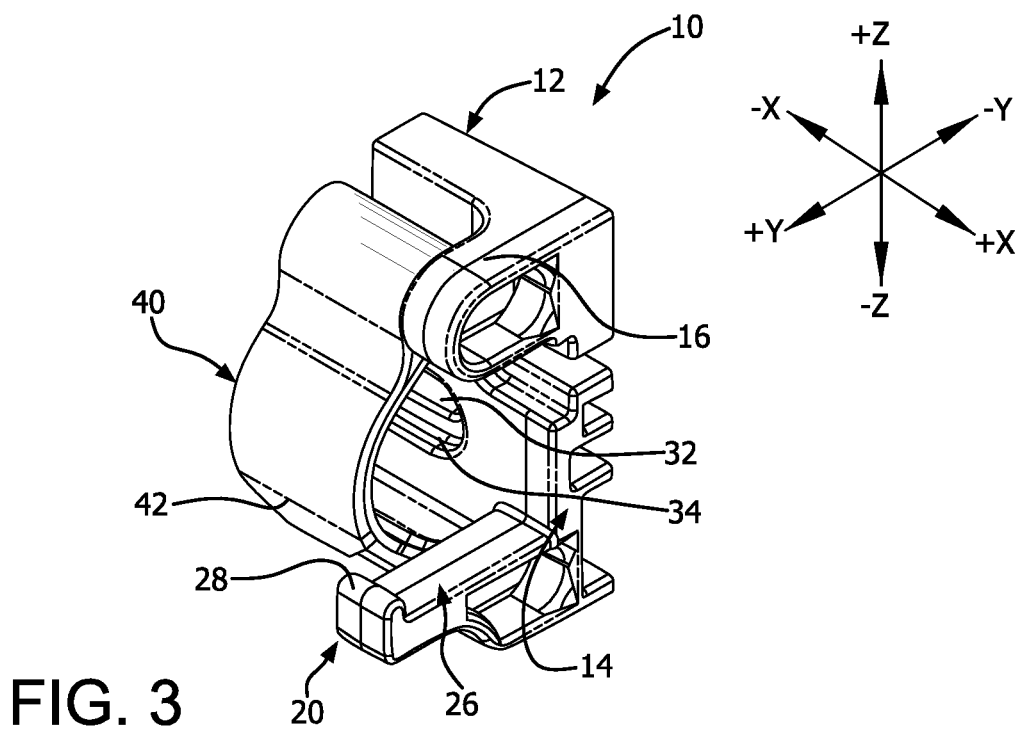
FIG. 3 is top-right perspective view of the bracket shown in FIGS. 1 and 2, depicting the strap in the folded state.
Figure 4A:
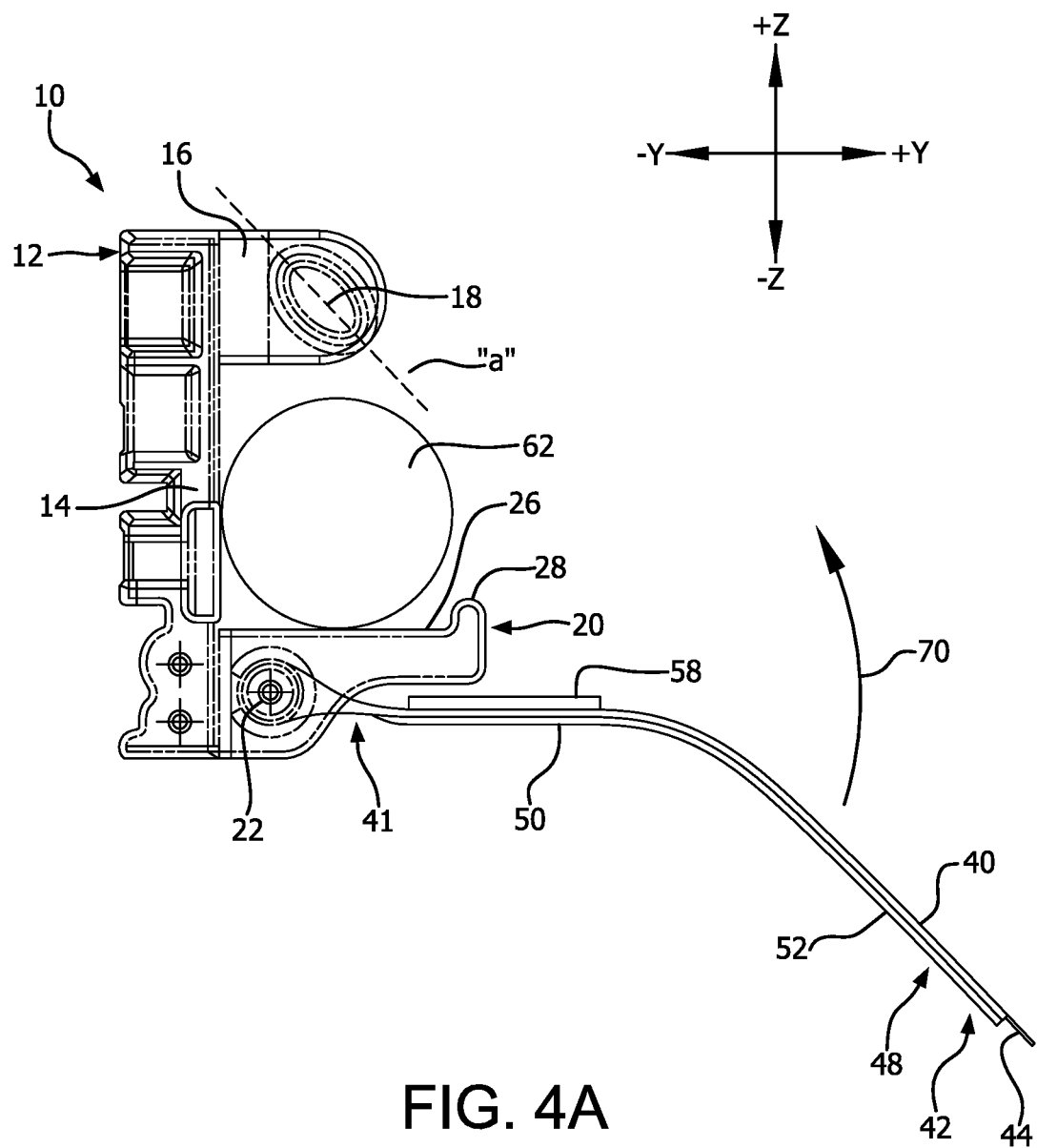
FIG. 4A is left side view of the bracket shown in FIGS. 1-3, depicting the strap in an unfolded state, and with the mallet resting on the bracket in an unsecured state.
Figure 4B:
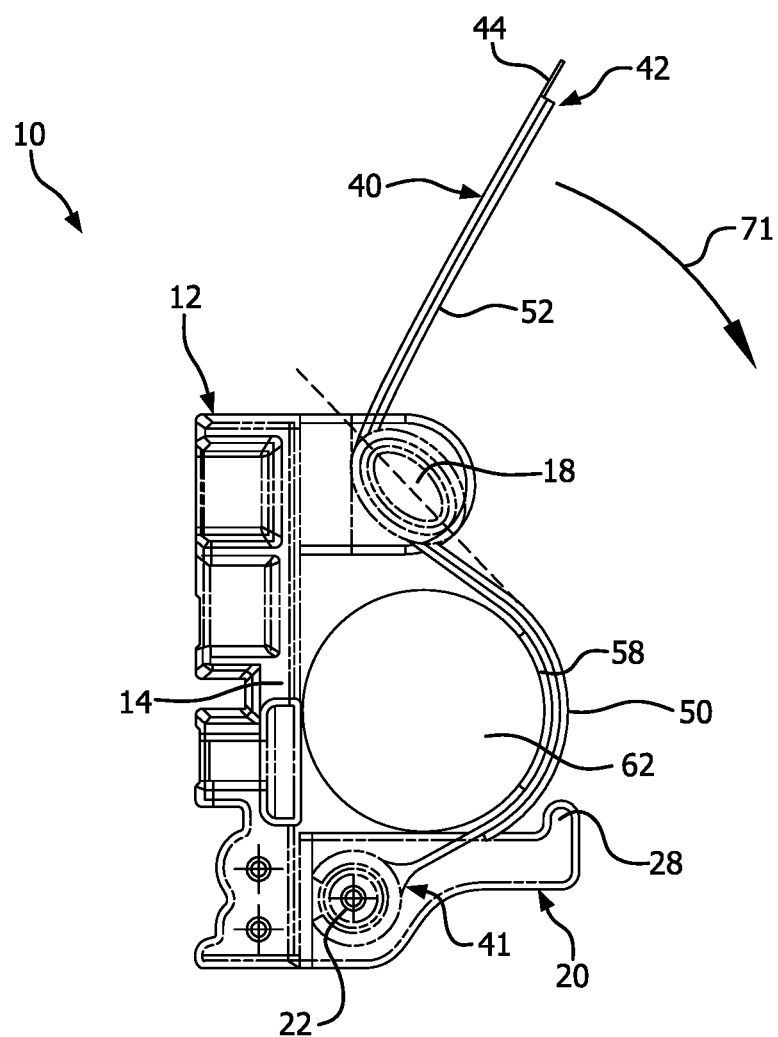
FIG. 4B is left side view of the bracket shown in FIGS. 1-4A, depicting the strap in the process of being folded to secure the mallet to the bracket.
Figure 5:
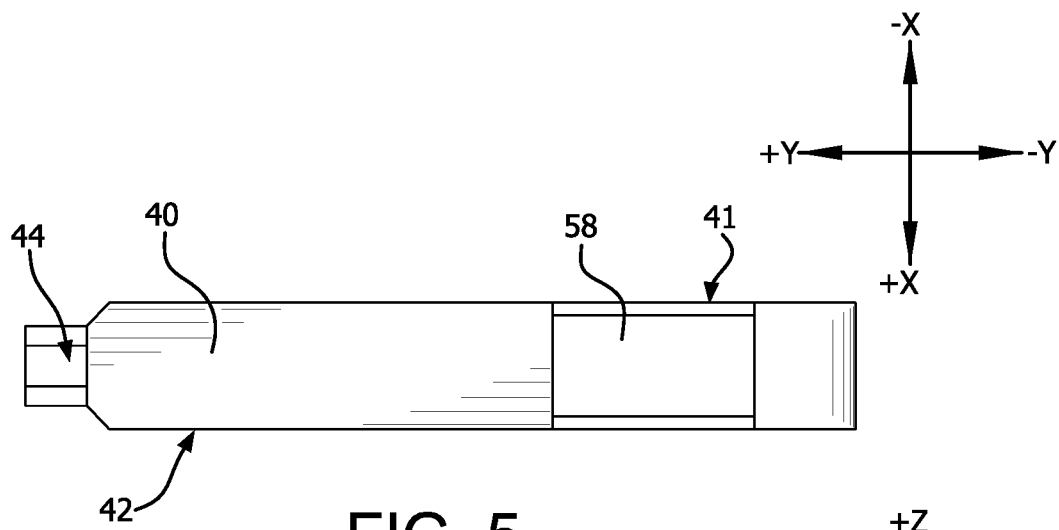
FIG. 5 is a top view of the strap of the bracket shown in FIGS. 1-4B.
Figure 8:
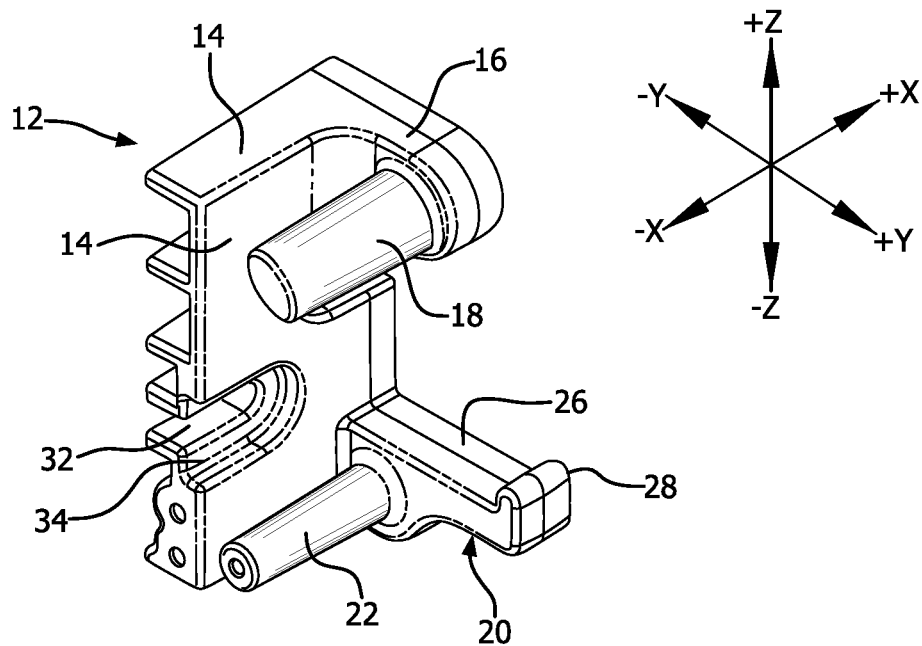
FIG. 8 is a top-left perspective view of a base of the bracket shown in FIGS. 1-4B.

Referring to FIGS. 1-4, 8, and 9, the bracket 10 comprises a base 12. The base 12 includes a mounting portion 14, and a first flange 16 that adjoins the mounting portion 14 at an upper end thereof. The base 12 also includes a post, or first arm 18. A first end of the first arm 18 adjoins the first flange 16, so that the first arm 18 extends from the first flange 16 substantially in a horizontal, or "−x" direction, and is spaced apart from the mounting portion 14, as can be seen in FIGS. 4 and 8. The first arm 18 thus is attached to the mounting portion 14 by way of the first flange 16. A second end of the first arm 18 is freestanding, i.e., is not attached to any other structure. The first arm 18 has an oval cross section, as can be seen in FIGS. 4A and 4B. The major axis of the cross section, designated "a" in FIG. 4, is oriented at an angle of about 45 degrees in relation to the vertical, or "z" direction. For reference, the vertical direction coincides with the lengthwise direction of the base.

The base 12 further comprises a second flange 20 that adjoins the mounting portion 14 at a lower end thereof; and a post, or second arm 22. A first end of the second arm 22 adjoins the second flange 20, so that the second arm 22 extends from the second flange 20 substantially in a horizontal, or "−x" direction, and is spaced apart from the mounting portion 14, as can be seen in FIGS. 4A, 4B, and 8. The second arm 22 thus is attached to the mounting portion 14 by way of the second flange 20.

The second flange 20 extends substantially outward, i.e., in the "+y" direction, from the mounting portion 14, as shown in FIG. 8. The second flange 20 has a substantially planar upper surface 26; and an upwardly-extending lip 28 at the freestanding end thereof.

The base 12 can be formed from high-strength plastic. Other suitable materials, such as aluminum, can be used in the alternative. The mounting portion 14, first flange 16, first arm 18, second flange 20, and second arm 22 are unitarily formed. Some, or all of these items can be formed separately, and can be connected by a suitable means such as fasteners or adhesive, in alternative embodiments.

Figure 9:
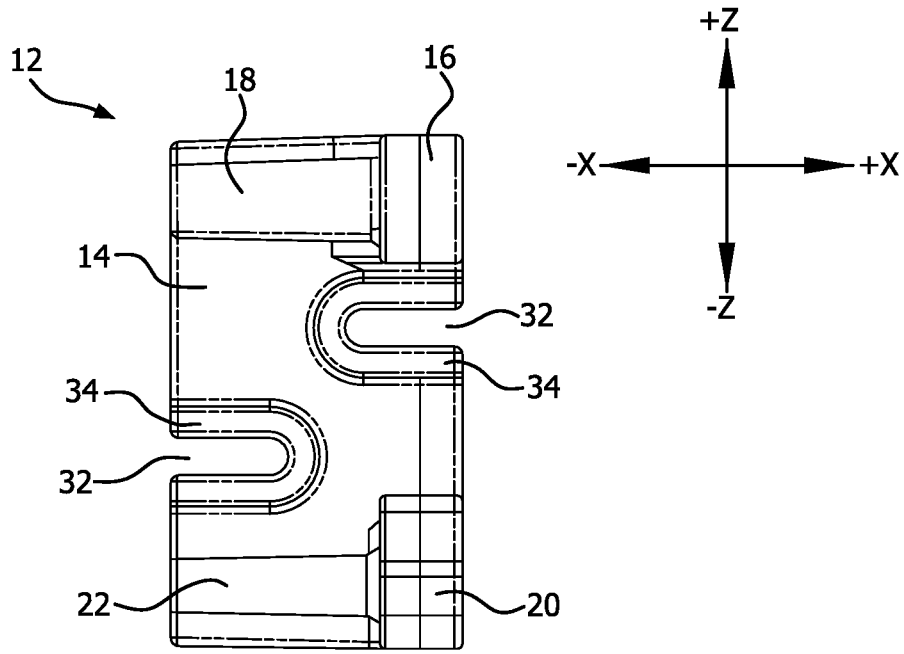
FIG. 9 is a front view of the base shown in FIG. 8.

The mounting portion 14 can be secured to the mounting surface 11 by screws or other suitable fasteners (not shown). As can be seen in FIG. 9, the base has two slots 32 formed therein to accommodate the fasteners. The slots 32 extend in the horizontal, or "x" direction. Each slot 32 adjoins a wider recess 34 that accommodates the head of the fastener. The use of the slots 32 instead of holes in the mounting portion 14 obviates any need to maintain a high tolerance in the spacing of the holes in the mounting surface 11 that accommodate the fasteners. Alternative embodiments can include less, or more than two of the slots 32.

The bracket 10 further comprises a strap 40 having a first end 41 and a second end 42. The first end 41 is attached to the second arm 22 of the base 12 by way of a permanent loop sewn into the first end 41. The strap 40 is retained on the second arm 22 by a plate 24, shown in FIG. 2. The plate 24 is fastened to a second end of the second arm 22, and to a side surface of the mounting portion 14 using removable fasteners or other suitable means. The second end 42 of the strap 40 is not permanently attached to any other structure. This mounting arrangement permits the strap 40 to be replaced by the user with a minimum of time and effort.

A pull tab 44 can be attached to the second end 42 of the strap 40. The pull tab 44 is colored bright orange, and has a fluorescent strip or other reflective features to help make the end of the strap 40 conspicuous under low-visibility conditions such as night operations and/or operations in smoke-filled environments. The pull tab 44 can be formed without these features in alternative embodiments.

The strap 40 can be formed from woven nylon; other types of materials can be used in the alternative. The strap 40 can have a width, or "x" dimension, of about 1½ inch; and a thickness, or "z" dimension, of about 3/32 inch. The dimensions of the strap 40 are application dependent, and can vary from the noted values in alternative embodiments.

Figure 6:
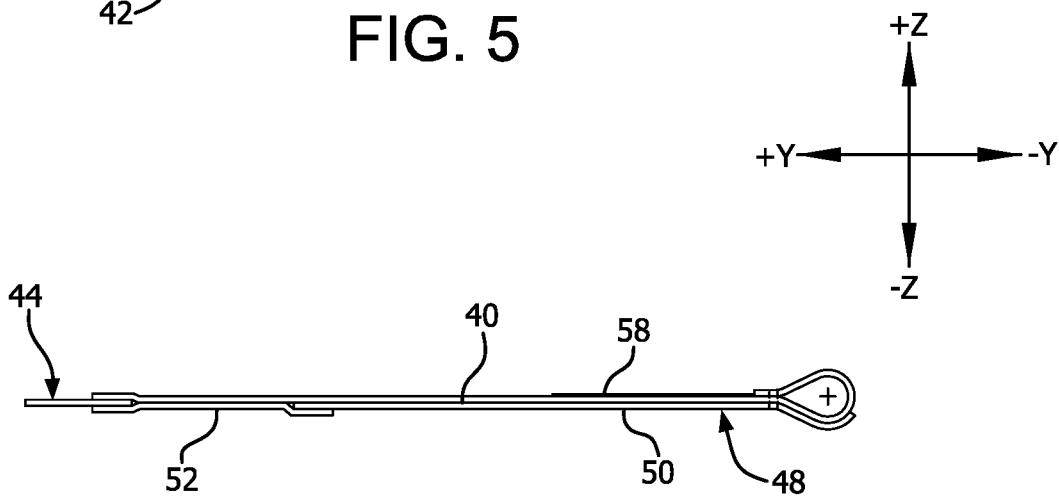
FIG. 6 is a side view of the strap shown in FIG. 5.
Figure 7:
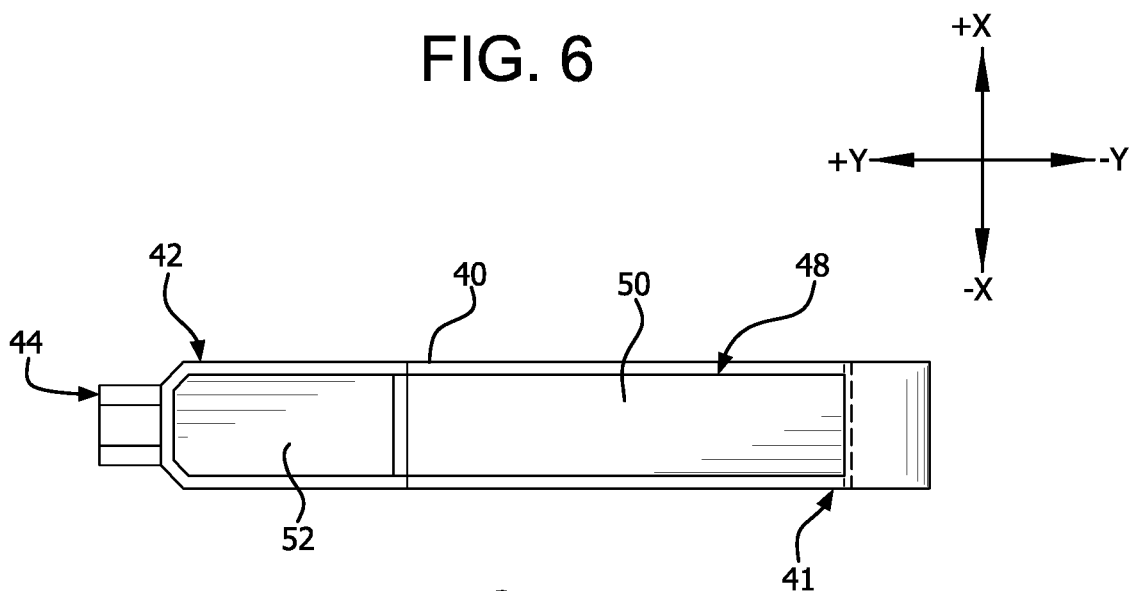
FIG. 7 is a bottom view of the strap shown in FIGS. 5 and 6.

Referring to FIGS. 4A, 6, and 7, a strip of hook and loop fasteners 48 is attached to an underside of the strap 40. The hook and loop fasteners can be, for example, VELCRO®. The first side of the strap 40 forms the underside of the strap 40, when the strap is unfolded and oriented as shown in FIG. 4A. The strip 48 has a first portion 50 and a second portion 52. The first portion 50 extends from the first end 41 of the strap 40, and spans about two-thirds of the overall length of the strap 40. The second portion 52 extends from the second end 42 of the strap 40, and spans the remaining length of the strap 40. The relative spans of the first portion 50 and the second portion 52 can vary in alternative embodiments. The first portion 50 includes the loop fasteners of the strip 48; the second portion 52 includes the hook fasteners that securely mate with the loop fasteners when the hook fasteners are brought into contact with the loop fasteners. The loop fasteners and the hook fasteners act as respective first and second fasteners that hold the strap 40 in a folded state, shown in FIGS. 1-3. The relative positions the loop fasteners and the hook fasteners on the strap 40 can be reversed in alternative embodiments.

A pad 58 is secured to a second, or top side of the strap 40, proximate the first end 41 of the strap 40. The pad 58 can be formed from a soft, durable material such as neoprene. The pad 58 is visible in FIGS. 4A-6. Alternative embodiments can be constructed without the pad 58.

An object can be secured to, and held in place by the bracket 10 as follows. For purposes of illustration, the object being secured is a mallet 60.

The strap 40 is initially placed in its unfolded state, as shown in FIG. 4A. A combination of factors allow the strap 40 to assume an orientation between the horizontal and vertical, as depicted in FIG. 4, when the strap 40 is unfolded, i.e., the strap 40 does not hang straight down when it is unfolded. These factors include the thickness and relatively dense weave of the material from which the strap 40 is formed; the additional stiffness provided by the strip of hook and loop fasteners 48 and the pad 58; friction between the second arm 22 and the strap 40; and contact between the end of the strip 48 and the adjacent surface of the mounting portion 14.

A handle 62 of the mallet 60 is placed against the mounting portion 14 by the user, between the first arm 18 and the second arm 22 once the strap 40 has been unfolded. The handle 62 can be rested on the upper surface 26 of the second arm 22, which provides a supporting surface for the handle 62 before, and after the handle 62 is secured to the bracket 10. The upwardly-extending lip 28 on the second arm 22 helps to retain the handle 62 on the upper surface 26 before, and after the handle 62 is secured to the bracket 10.

The strap 40 is folded and secured in its folded state once the handle 62 has been positioned on the bracket 10. Provided the mallet 60 is balanced on the second arm 22, the user can fold and secure the strap 40 using only one hand. To fold the strap 40, the user grasps the pull tab 44 and/or the second end 42 of the strap 40. The user then lifts the pull tab 44 and/or the second end 42 while holding the strap 40 taunt, so that the strap 40 rotates about the second arm 22 of the base 12.

As the strap 40 rotates and the second end 42 continues to rise in the general direction denoted by the arrow 70 in FIG. 4A, the pad 58 moves into contact with the handle 62. Further rotation of the strap 40 causes the second end 42 to move generally back toward the mounting surface 11, i.e., in the "−y" direction. At this point, the user moves the strap 40 to the left from the perspective of FIG. 9. i.e., in the "−x" direction, so that the strap 40 clears the first arm 18. A portion of the strap 40 is then aligned with the space between the first arm 18 and the mounting portion 14, and is inserted into the space from the side by moving the strap 40 back to the right. The flexibility of the strap 40, and the freestanding configuration of the end of the first arm 18, allow the strap 40 to be positioned between the first arm 18 and the mounting portion 14 quickly and easily, without the necessity of feeding the strap 40 lengthwise between the first arm 18 and the mounting portion 14.

Referring to FIG. 4B, the user next pulls the second end 42 of the strap 40 back toward the user, i.e., in the "+y" direction, while maintaining tension in the strap 40. This causes the second end 42 to rotate around the first arm 18, in the general direction denoted by the arrow 71 in FIG. 4B. Pulling the strap 40 toward the user, i.e., away for the mounting surface 11, also helps to ensure that the strap 40 is seating snugly on the handle 62. Continued rotation of the second end 42 around the first arm 18 causes the second end 42 to move generally downward as the strap 40 progressively wraps around the first arm 18 and folds back on itself. Continued rotation of the strap 40 eventually brings the first and second portions 50, 52 of the strip of hook and loop fasteners 48 into contact with each other, as depicted in FIGS. 1-3. The user then can press on the strap 40 to further urge the hook fasteners on the second portion 52 of the strip 48 into secure engagement with the loop fasteners on the first portion 50 of the strip 48.

At this point, the mallet 60 is secured to the bracket 10, and is suspended from the mounting surface 11. The handle 62 is secured from moving outward, i.e., in the "+y" direction, by the strap 40, which in turn is restrained by the first arm 18 and the second arm 22. The orientation of the major axis "a" of the first arm 18 coincides substantially with the direction in which the strap 40 loads the first arm 18; the maximum load-bearing capability of the first arm 18 thus coincides substantially with the direction of the applied loading on first arm 18.

Once the strap 40 is secured as described above, friction between the handle 62 and the pad 58 on the strap 40 helps to restrain the mallet 60 from movement in the lateral, or "x" direction. The pad 58 also helps to protect the handle 62 from scuffing and scratching. The mallet 60 is supported in the vertical, or "z" direction, by the strap 40 and the second arm 22.

The configuration of the flexible strap 40 and the base 12 permits the strap 40 to be pulled and tightened to the exact length needed to secure the mallet 60 or other object to the bracket 10. The strap 40 thus self-adjusts to the effective length needed for a particular object regardless of the size of the object, provided the object is within the specified size range for use with the bracket 10. It is believed that this feature can provide a more secure connection between the bracket 10 and the object being held, in comparison to a bracket or other securing means in which the strap or other movable portion can only be positioned in a finite number of positions.

The mallet 60 can be removed from the bracket 10 as follows. The user initially grasps the pull tab 44, and pulls upwardly and outwardly, i.e., in the "+z" and "+y" directions. This action separates the hook fasteners on the second portion 52 of the strip 48 from the loop fasteners on the first portion 50. Once the hook and loop fasteners have been separated completely, the user can grasp the handle 62 and pull the handle 62 in the outward direction, away from the base 12. Because the second end 42 of the strap 40 is now free, while the first end 41 remains restrained by the second arm 22, pulling the handle 62 outward draws the portion of the strap 40 contacting the handle 62 outward, while the portion of the strap 40 proximate the second end 42 is drawn toward, and then under the first arm 18. Once the second end 42 reaches, and then clears the first arm 18, the strap 40 deflects to its unfolded state, and the mallet 60 is free of the bracket 10. Thus, there is no need for the user to move the strap 40 to its unfolded state; to move the strap 40 in front of the first arm 18; or to otherwise manipulate the strap 40 before pulling the handle 62 outwardly, since the flexibility of the strap 40, and the ability to release the second end 42 of the strap 40 from any restraint, allow the strap 40 to be drawn out of the way of the handle 62 simply by pulling the handle 62 outwardly after the hook and loop fasteners have been separated. Also, the entire removal process can be performed easily using one hand.

The ability to release the mallet 60 from its secure position on the bracket 10 with one hand, simply by pulling upward on the pull tab 44 and/or the second end 42 of the strap 40, and then pulling the handle 62 outward, makes the bracket 10 is particularly well suited, for example, for use by first responders in emergency situations in which rapid response time is critical. As noted above, the brightly colored and reflective pull tab 44 can help the user locate the second end 42 of the strap 40 under low visibility conditions, and the pull tab 44 provides the user with a freestanding feature that can be grasped easily even when the user is wearing heavy gloves. Also, the relatively soft strap 40 will not scratch or otherwise damage the handle 62 as the strap 40 slides over the handle 62 during removal of the mallet 60.

In applications where the object to be secured is relatively long, such as a large axe commonly used by firefighters, two or more brackets 10, spaced apart along the length of the object, can be used to secure the object to the mounting surface 11.

Figure 13:
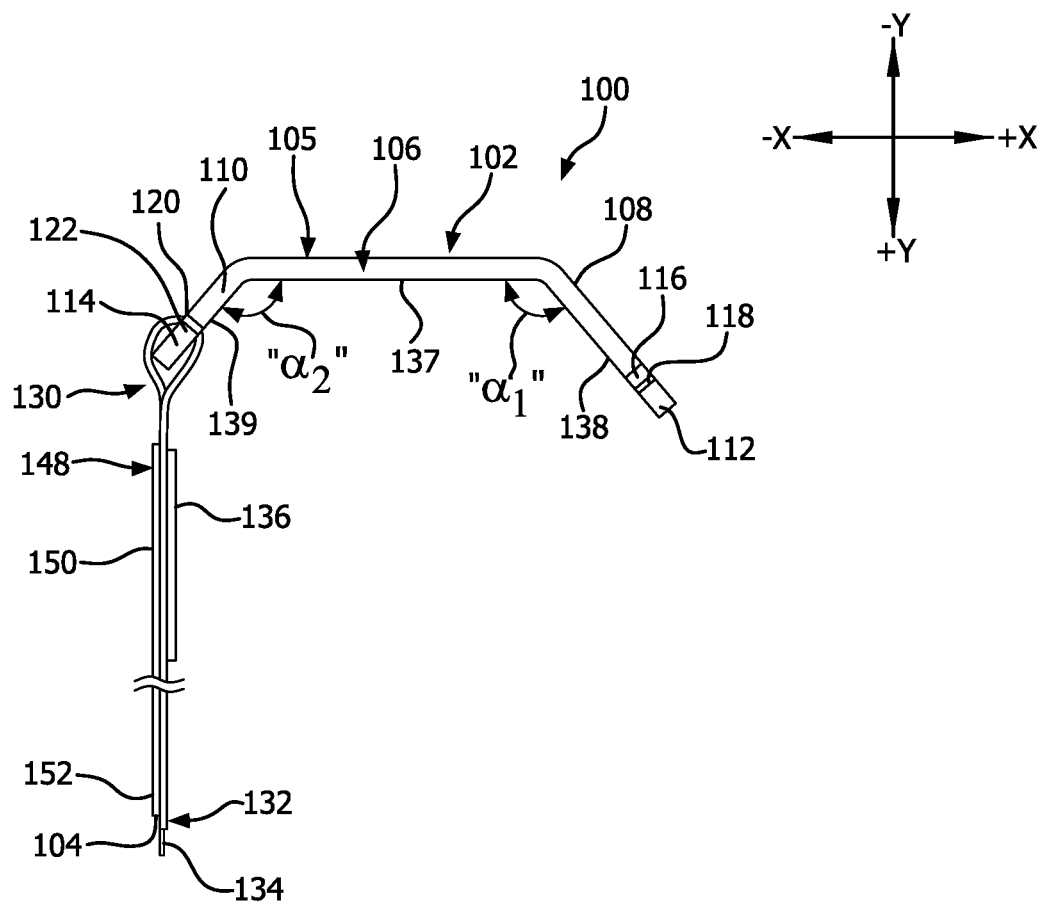
FIG. 13 is a top view of the bracket shown in part in FIGS. 10-12, depicting a strap of the bracket in an unfolded state.
Figure 14:
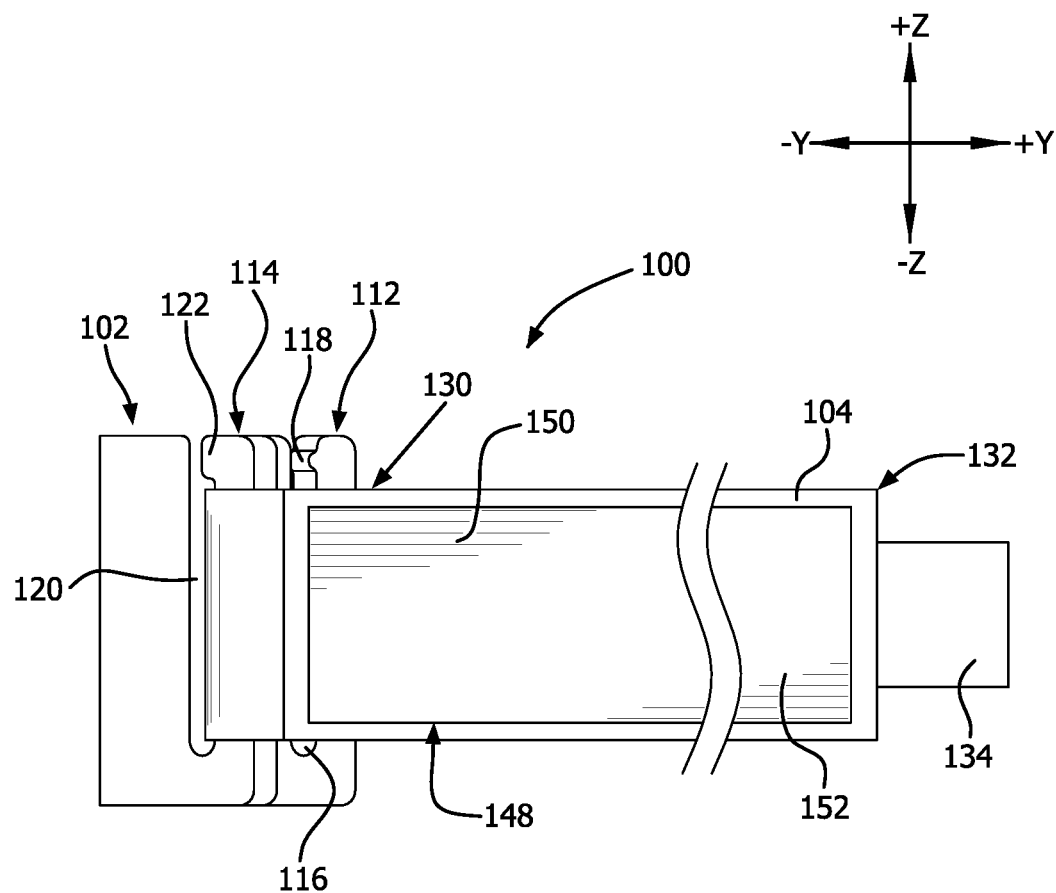
FIG. 14 is a left view of the bracket shown in FIGS. 10-13, depicting the strap in the unfolded state.
Figure 15:
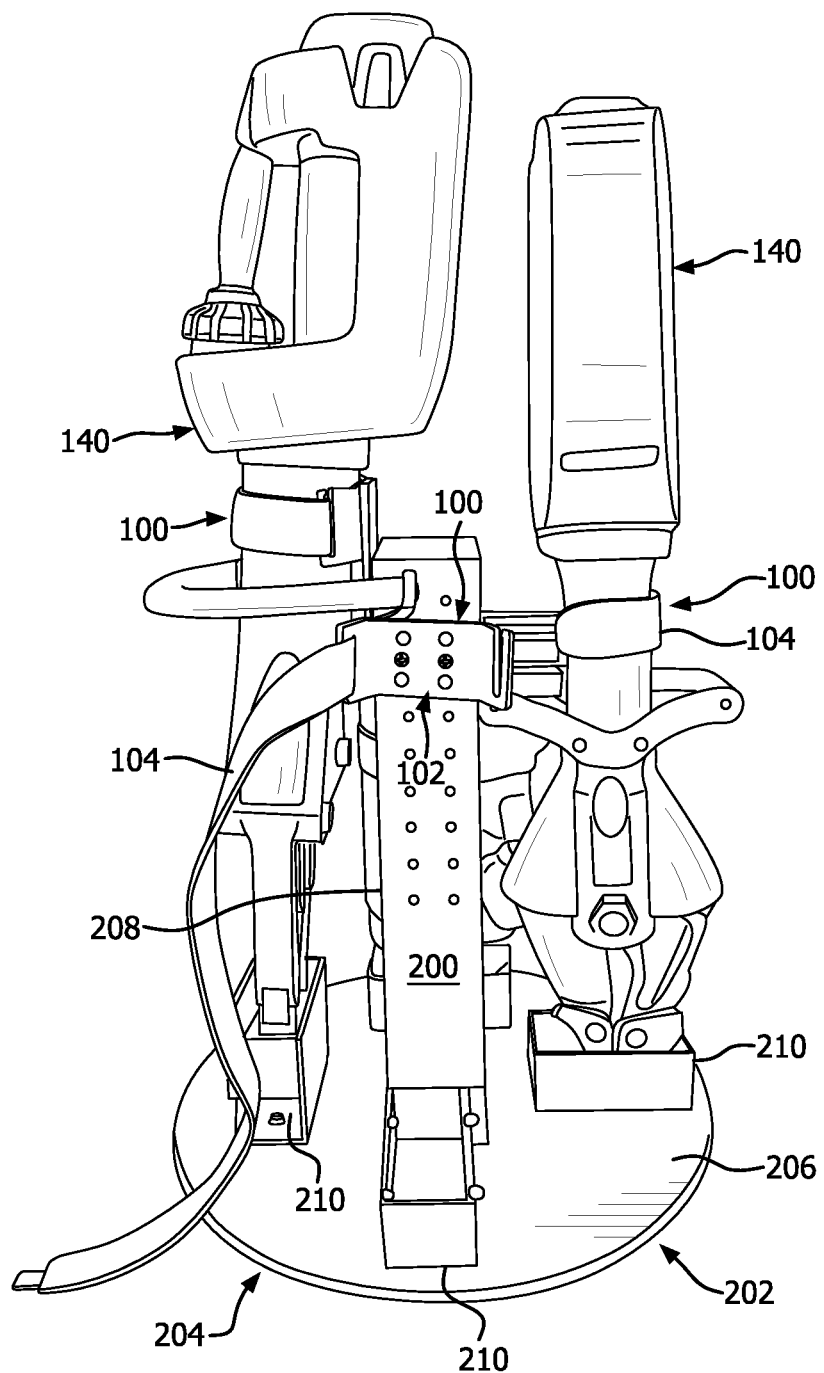
FIG. 15 is a side view of three of the brackets shown in FIGS. 10-14 installed on a carousel mount, with two of the brackets depicted as securing extrication tools to the carousel mount.

FIGS. 10-16 depict an alternative embodiment in the form of a bracket 100, and various components thereof. The bracket 100 can be used, for example, to secure an upper end of a large tool, such as an extrication tool 140 used to cut the structure of a damaged vehicle to facilitate extrication of crash victims from the vehicle. The tool 140 is depicted in FIG. 15. The use of bracket 100 to support the tool 140 is disclosed for exemplary purposes only. The bracket 10 can be used to support other types of objects, such as stabilization and rescue struts.

Figure 10:
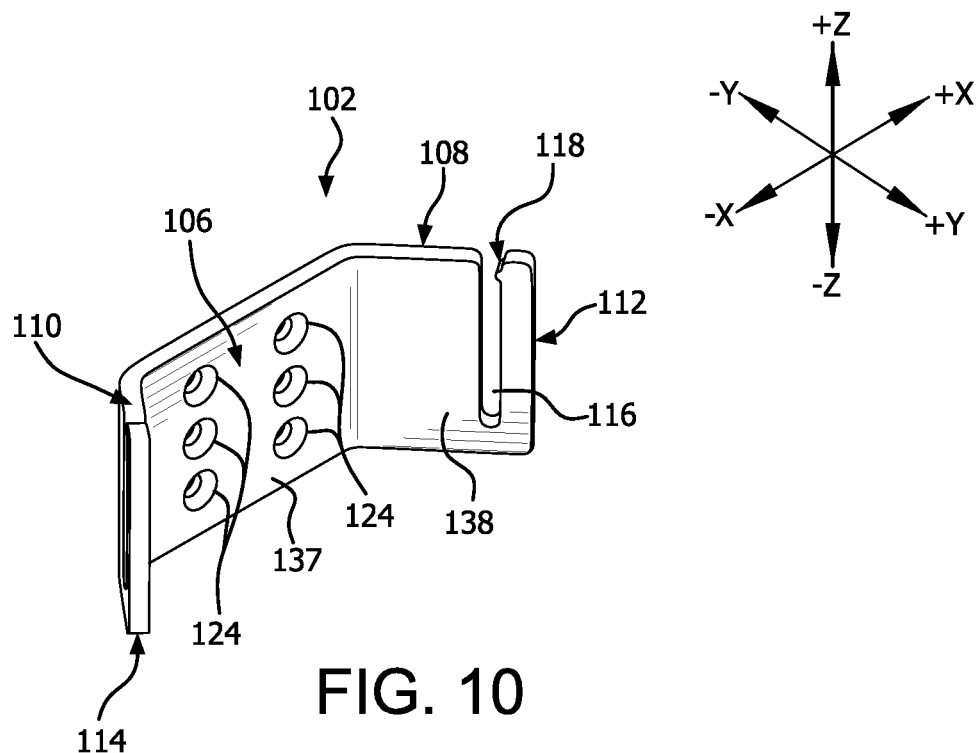
FIG. 10 is a top-left perspective view of a base of an alternative embodiment of the bracket shown in FIGS. 1-9.
Figure 11:
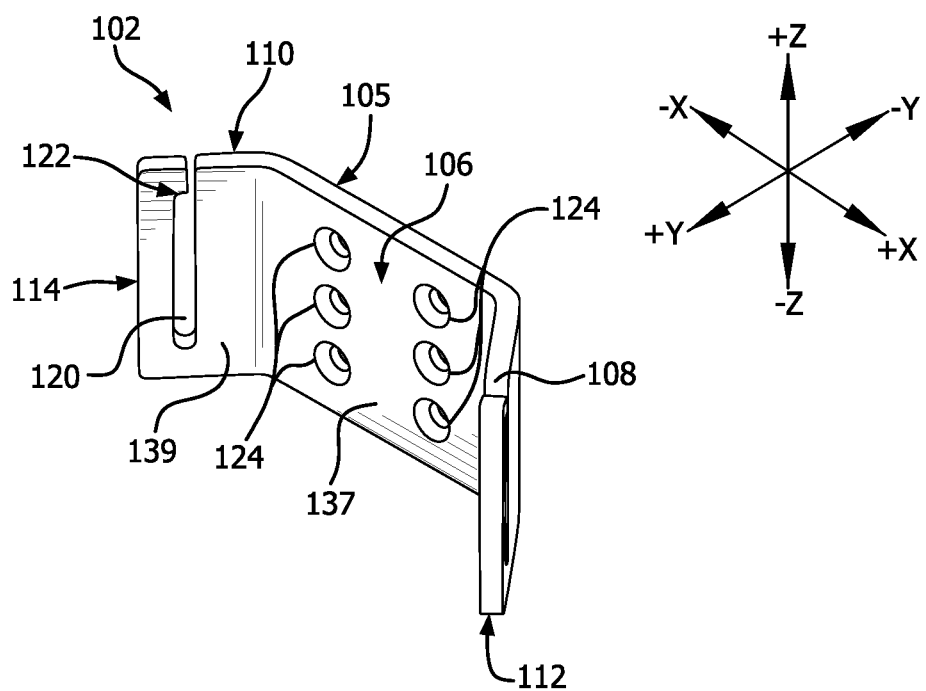
FIG. 11 is a top-right perspective view of the base shown in FIG. 10.
Figure 12:
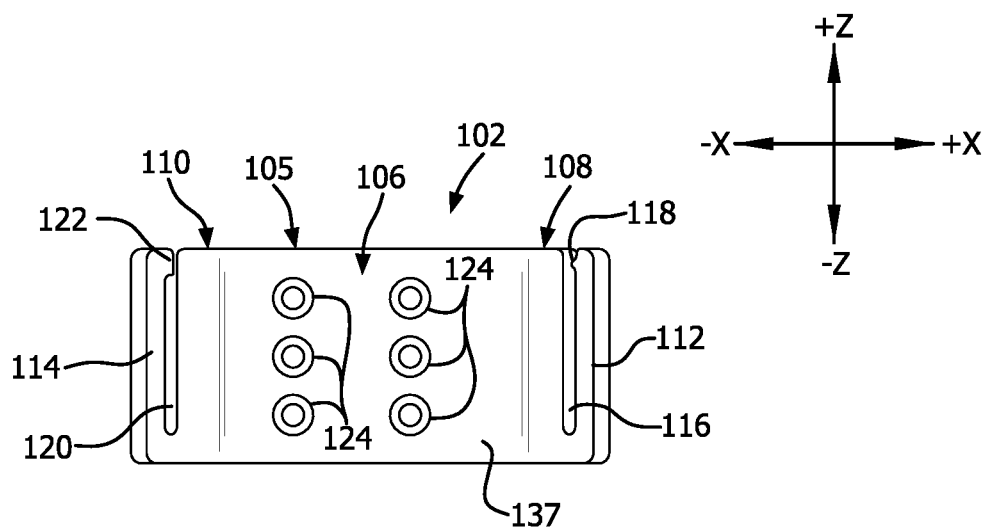
FIG. 12 is a front view of the base shown in FIGS. 10 and 11.

Referring to FIGS. 10-14, the bracket 100 includes a base 102 and a strap 104. The base 102 comprises a mounting portion 105. The mounting portion 105 has a first section 106, a second section 108 that adjoins the first section 106, and a third section 110 that adjoins the first section 106. The second section 108 and the third section 110 are located on opposite sides of the first section 106, as can be seen in FIGS. 12 and 13.

The first section 106 has a substantially planar major surface 137; and the second section 108 has a substantially planar major surface 138. The major surface 138 is oriented at acute angle, denoted "$\alpha_1$" in FIG. 13, in relation of the major surface 137. The third section 110 has a substantially planar major surface 139. The major surface 139 is oriented at acute angle, denoted "$\alpha_2$" in FIG. 13, in relation of the major surface 137.

Referring to FIGS. 10-13, the base 102 also includes a first arm 112 and a second arm 114. A first end of the first arm 112 adjoins the second section 108 of the mounting portion 105; a second end of the first arm 112 is freestanding. The first arm 112 and the second section 108 define a gap 116. The second end of the first arm 112 has a lip 118 formed thereon.

A first end of the second arm 114 adjoins the third section 110 of the mounting portion 105; a second end of the second arm 114 is freestanding. The second arm 114 and the third section 110 define a gap 120. The second end of the first arm 112 has a lip 122 formed thereon.

The base 102 can be formed from aluminum. Other suitable materials, such as high-strength plastic, can be used in the alternative. The first section 106, second section 108, third section 110, first arm 112, and second arm 114 are unitarily formed. Some, or all of these items can be formed separately, and can be connected by a suitable means such as fasteners, adhesive, or welding, in alternative embodiments.

The base 102 can be secured to a mounting surface 200 by screws or other suitable fasteners (not shown). The mounting surface 200 is depicted in FIG. 15. The first section 106 of mounting portion 105 has six holes 124 formed therein to accommodate the fasteners, as can be seen in FIGS. 10-12. Less than six fasteners can be used to secure the bracket 10 to the mounting surface 200; the first section 106 is provided with six of the holes 124 to provide flexibility in the placement of the bracket 100 on the mounting surface 200. Alternative embodiments can include less, or more than six of the holes 124.

Figure 16:
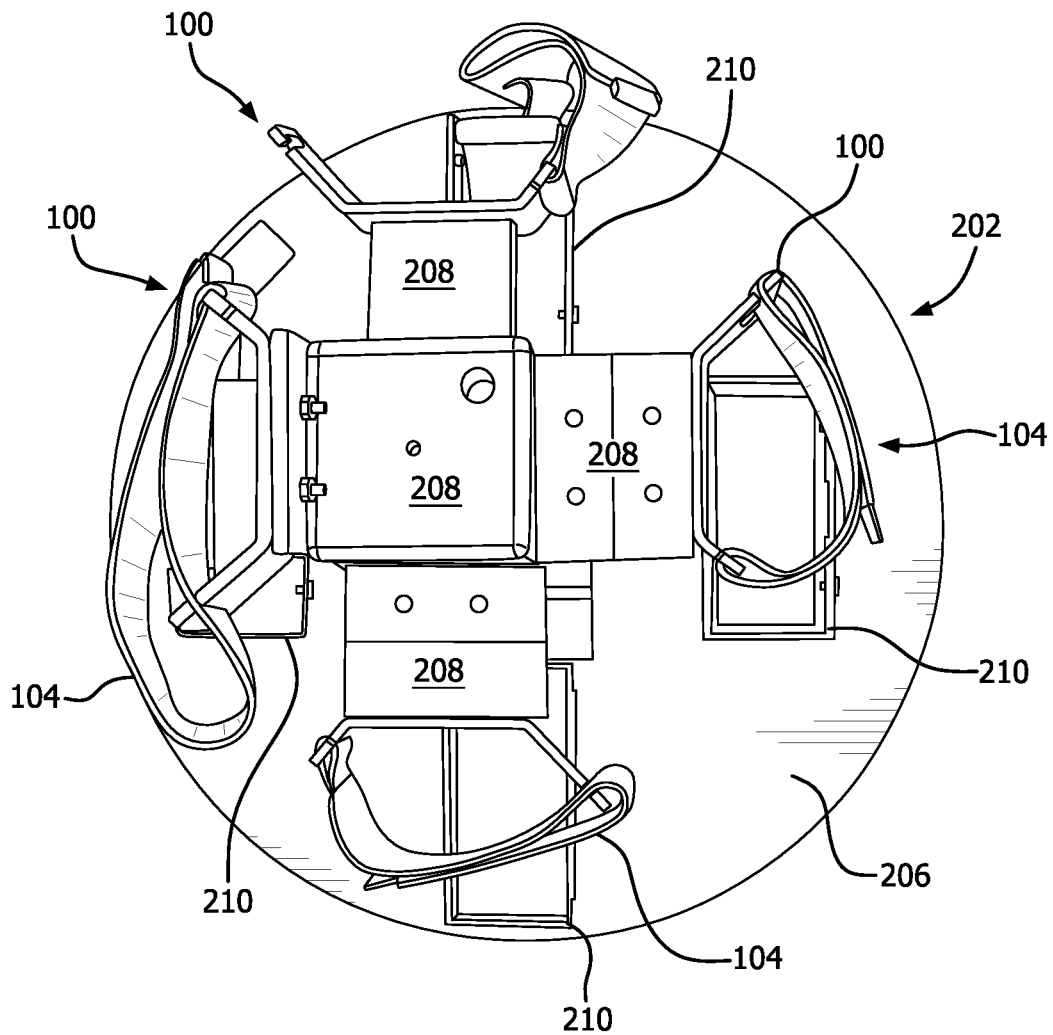
FIG. 16 is a top view of the carousel mount shown in FIG. 15, with four of the brackets installed thereon, and without any of the extrication tools.

The mounting surface 200 can be a vertically-oriented surface of a carousel mount 202, depicted in FIGS. 15 and 16. The carousel mount 202 can be used to stow up to four of the extrication tools 140, or other devices. The carousel mount 202 includes a base 204 having a rotating portion 206 and a static portion (not shown). The rotating portion 206 is positioned for rotation on the static portion; the static portion rests on a floor or other supporting surface. The mount 202 also includes a plurality of posts 208 mounted on the rotating portion 206; and four trays 210 also mounted on the rotating portion 206. Each post 208 includes one or more of the mounting surfaces 200.

Each mounting surface 200 can accommodate one or more of the brackets 100. The mounting surfaces 200 each have two vertically-oriented columns of mounting holes formed therein, as can be seen in FIG. 15. The holes are configured to receive the fasteners that secure the brackets 100 to the mounting surfaces 200. Each pair of opposing holes in the two columns is spaced apart by a distance about equal to the spacing between the pairs of opposing holes 124 in the first section 106 of mounting portion 105, so that each hole om the mounting surface 200 can align with a corresponding hole 124.

The carousel mount 202 can be positioned in an equipment bay of an emergency vehicle such as a fire engine. The bracket 100 is described in connection with the carousel mount 202 for illustrative purposes only. The bracket 100 can be mounted on, and used in conjunction with other types of structures.

The base 102 can be secured to the mounting surface 200 in a substantially horizontal orientation, i.e., with the first and second arms 112, 114 located to the right and left of the first section 106 of the mounting portion 105, respectively; and with the freestanding ends of the first and second arms 112, 114 forming the respective upper ends of the first and second arms 112, 114, as shown in FIGS. 12 and 15. This orientation accommodates a mounting arrangement for the extrication tool 140 in which a first end of the tool 140 rest in a corresponding tray 210 of the mounting carousel 202, while the bracket 100 restrains an upwardly-oriented portion of the tool 140 from lateral movement, as depicted in FIG. 15. In such applications, the weight of the tool 140 is borne primarily by the base 204 of the carousel mount 202, rather than the bracket 100. In the example illustrated herein, the tool 140 is stowed with the larger portion of the tool 140 in an upward orientation, and the cutting arms of the tool 140 disposed in the tray 210.

The strap 104 is substantially similar to the strap 40 of the bracket 10, and unless otherwise noted, the above-noted characteristics of the strap 40 apply equally to the strap 104. Referring to FIGS. 13 and 14, the strap 104 has a first end 130 and a second end 132. A pull tab 134 can be attached to the second end 132. The strap 104 can have a width, or "x"

dimension, of about two inches; and a thickness, or "z" dimension, of about 3/32 inch. The dimensions of the strap 104 are application dependent, and can vary from the noted values in alternative embodiments. The pull tab 134 can be substantially similar to the pull tab 44 of the bracket 10. A pad 136 is secured to a first side of the strap 104. The pad 136 can be formed from a soft, durable material such as neoprene. Alternative embodiments can be constructed without the pad 136.

A strip of hook and loop fasteners 148 is attached to a second side of the strap 104. The hook and loop fasteners can be, for example, VELCRO®. The strip 148 has a first portion 150 and a second portion 152. The first portion 150 extends from the first end 130 of the strap 104, and spans about two-thirds of the overall length of the strap 104. The second portion 152 extends from the second end 132 of the strap 104, and spans the remaining length of the strap 104. The relative spans of the first portion 150 and the second portion 152 can vary in alternative embodiments. The first portion 150 includes the loop fasteners of the strip 148; the second portion 152 includes the hook fasteners that securely mate with the loop fasteners when the hook fasteners are brought into contact with the loop fasteners. The hook and loop fasteners hold the strap 104 in a folded state, shown in FIG. 16. The relative positions the loop fasteners and the hook fasteners on the strap 104 can be reversed in alternative embodiments.

The first end 130 of the strap 104 has a permanent loop sewn therein. The loop is positioned over the second arm 114, as can be seen in FIGS. 13 and 14. The gap 120 between the second arm 114 and the third section 110 of mounting portion 105 allows the loop to fit between the second arm 114 and the third section 110, so that the loop can be inserted over, and onto the second arm 114 by way of the freestanding end of the second arm 114. The strap 104 has a width, or "z" dimension, that causes the strap 104 to lie inside of the lip 122, i.e., between the lip 122 and the fixed, or non-freestanding end of the second arm 114, as shown in FIG. 14. The lip 122 locally reduces the gap 120 to a value about equal to, or slightly less than the thickness of the strap 104. Thus, the lip 122 retains the first end 130 of the strap 104 on the second arm 114, while permitting the loop on the first end 130 to be removed from, and inserted onto the second arm 114 to facilitate removal and replacement of the strap 104 by the user.

The extrication tool 140 can be secured to, and held in place by the bracket 100 as follows. The strap 104 is initially placed in its unfolded state, as shown in FIGS. 13 and 14. The tool 140 can be positioned so that its first end is positioned in one of the trays 110 of the carousel mount 202; and an upwardly-oriented portion of the tool 140 is positioned against the first section 106 of mounting portion 105 of one of the brackets 100 mounted on the carousel mount 202, as illustrated in FIG. 15. In applications where the object being secured is relatively wide, the object also may rest against the second section 108 and/or the third section 110 of the mounting portion 105.

The strap 104 is folded and secured in its folded state once the extrication tool 140 has been positioned against the base 102. The folding process for the strap 104 is similar to that described above in relation to the strap 40, with the exception that the strap 104 assumes a substantially horizontal orientation when folded, while the strap 40 is substantially vertical when folded in the exemplary applications disclosed herein. To fold the strap 104, the user grasps the pull tab 134 and/or the second end 132 of the strap 104, and pulls the strap 104 taunt. The user then moves the pull tab 134 and/or the second end 132 generally to the side, toward the first arm 112, while maintaining tension in the strap 104. This action causes the strap 104 to rotate about the second arm 114 of the base 102.

As the strap 104 rotates toward the second arm 114, the pad 136 moves into contact with the extrication tool 140. Further rotation of the strap 104 moves the second end 132 of the strap 104 into proximity with the first arm 112 of the base 102. At this point, the user moves the strap 104 upward, i.e., in the "+z" direction, so that the strap 104 clears the first arm 112. A portion of the strap 104 is then aligned with, and inserted into the gap 116 between the first arm 112 and the second section 108 of the mounting portion 105. The flexibility of the strap 104, and the freestanding configuration of the second end of the first arm 112, allow the strap 104 to be positioned between the first arm 112 and the second section 108 quickly and easily, without the necessity of feeding the strap 104 lengthwise through the gap 116. This characteristic can be particularly advantageous when a particular strap is relatively long, like the strap 104, in order to secure relatively heavy item such as the extrication tool 140.

Once inserted in the gap 116, the strap 104 lies inside of the lip 118 on the second arm 114, i.e., between the lip 118 and the fixed, or non-freestanding end of the first arm 112, as can be seen in FIG. 14. The lip 118 locally reduces the gap 116 to a value about equal to, or slightly less than the thickness of the strap 104, and thus helps to retain the second end 132 of the strap 104 on the first arm 112.

The user next pulls the second end 132 of the strap 104 back toward the user, i.e., generally in the "+y", direction while maintaining tension in the strap 104, in a manner substantially similar to the above-described folding of the strap 40 of the bracket 10. This causes the second end 132 to rotate around the first arm 112. The second end 132 is then moved back toward the second arm 114, which causes the strap 104 to progressively wrap around the first arm 112 and fold back on itself. Continued rotation of the strap 104 eventually brings the first and second portions 150, 152 of the strip of hook and loop fasteners 148 into contact with each other. The user then can press on the strap 104 to further urge the hook fasteners on the second portion 152 of the strip 148 into secure engagement with the loop fasteners on the first portion 150 of the strip 148. The relatively long length, or side to side dimension, of the second section 108 of the mounting portion 105, which can be seen in FIG. 13, can help the user to impart sufficient tension in the strap 104 to secure a relatively large and heavy object such as the extrication tool 140.

At this point, the upwardly-oriented portion of the extrication tool 140 has been secured to the bracket 100, which in turn secures the tool 140 to the carousel mount 202. The upwardly-oriented portion of the tool 140 is secured from moving generally outward, i.e., in the "+y" direction, by the strap 104, which in turn is restrained by the first arm 112 and the second arm 114. Also, the strap 104, along with the second section 108 and the third section 110 of mounting portion 105, help to restrain the upwardly-oriented portion of the tool 140 from side to side movement, i.e., from movement in the +/-"x" direction.

The extrication tool 140 can be removed from the bracket 100 as follows. The user initially grasps the pull tab 136, and pulls generally outward, away from the base 102. This action separates the hook fasteners on the second portion 152 of the strip 148 from the loop fasteners on the first portion 150. Once the hook and loop fasteners have been separated completely, the user can pull the extrication tool 104 and in the outward direction, away from the base 102. Because the second end 132 of the strap 104 is now free, while the first end 130 remains restrained by the second arm 114, pulling the tool 140 outward draws the portion of the strap 104 contacting the tool 140 outward, while the portion of the strap 104 proximate the second end 132 is drawn toward, and then under the first arm 112. Once the second end 132 reaches, and then clears the first arm 112, the strap 104 assumes its unfolded state and the extrication tool 140 is free of the bracket 100. Thus, there is no need for the user to move the strap 104 to its unfolded state, to move the strap 104 in front of the first arm 112, or to otherwise manipulate the strap 104 before pulling the tool 140 outwardly, since the flexibility of the strap 104, and the ability to release the second end 132 of the strap 104 from any restraint, allow the strap 104 to be drawn out of the way of the tool 140 simply by pulling the upwardly-oriented portion of the tool 140 outwardly after the hook and loop fasteners have been separated.

We claim:

1. A bracket for securing an object to a mounting surface, comprising:
    a base comprising: a mounting portion configured for mounting on the mounting surface; a first arm; a second arm; a first flange adjoining the mounting portion; and a second flange having a first end adjoining the mounting portion, and a freestanding second end; wherein: the first arm adjoins the first flange; and the second arm adjoins the second flange at a location on the second flange between the first and the second ends of the second flange;
    a strap having a first end attached to the second arm, and a second end;
    a first fastener attached to a first portion of the strap;
    a second fastener attached to a second portion of the strap and configured to mate with the first fastener; wherein: the strap is configured to be placed in a folded state in which the first portion of the strap spans the space between the first and second arms; the strap wraps around the first arm so that the second portion of the strap folds back, and over the first portion to place the second fastener in contact with the first fastener; a first end of the strap has a loop formed therein; and the loop is positioned over the second arm; and
    a plate attached to the second arm and the mounting portion and configured to retain the first end of the strap on the first arm.

2. The bracket of claim 1, wherein the first and second arms define in part a space for receiving the object.

3. The bracket of claim 1, wherein the base further comprises: a first flange adjoining the mounting portion and the first arm; and a second flange adjoining the mounting portion and the second arm.

4. The bracket of claim 1, wherein the first fastener comprises hook fasteners and the second fastener comprises loop fasteners.

5. The bracket of claim 1, wherein the first fastener comprises loop fasteners and the second fastener comprises hook fasteners.

6. The bracket of claim 1, wherein the first arm has a substantially oval cross section.

7. The bracket of claim 6, wherein a major axis of the cross section of the first arm is oriented at an angle of about 45 degrees in relation to a length of the base.

8. The bracket of claim 1, further comprising a pull tab attached to the second end of the strap.

9. The bracket of claim 1, wherein the mounting portion has a first and a second slot formed therein and configured to receive fasteners for securing the base to the mounting surface.

10. The bracket of claim 3, wherein a first end of the first arm adjoins the first flange, and a second end of the first arm is freestanding.

11. The bracket of claim 1, wherein the second flange is configured to form a supporting surface for the object.

12. The bracket of claim 1, wherein the mounting portion comprises a major surface, and the first and second flanges extend from the major surface.

13. The bracket of claim 1, wherein the first and second flanges extend away for the mounting portion in substantially the same direction.

14. The bracket of claim 1, a length of the second flange is greater than a length of the first flange.

15. A bracket for securing an object to a mounting surface, comprising:
    a base comprising: a mounting portion configured for mounting on the mounting surface; a first arm; a second arm; a first flange adjoining the mounting portion; and a second flange having a first end adjoining the mounting portion, and a freestanding second end; wherein: a first end of the first arm adjoins the first flange; a second end of the first arm is freestanding; and the second arm adjoins the second flange at a location on the second flange between the first and the second ends of the second flange;
    a strap having a first end attached to the second arm, and a second end;
    a first fastener attached to a first portion of the strap; and
    a second fastener attached to a second portion of the strap and configured to mate with the first fastener; wherein the strap is configured to be placed in a folded state in which the first portion of the strap spans the space between the first and second arms, and the strap wraps around the first arm so that the second portion of the strap folds back, and over the first portion to place the second fastener in contact with the first fastener.

16. A bracket for securing an object to a mounting surface, comprising:
    a base comprising: a mounting portion configured for mounting on the mounting surface; a first arm; a second arm; a first flange adjoining the mounting portion; and a second flange having a first end adjoining the mounting portion, and a freestanding second end; wherein: the first arm adjoins the first flange; the second arm adjoins the second flange at a location on the second flange between the first and the second ends of the second flange; and a length of the second flange is greater than a length of the first flange;
    a strap having a first end attached to the second arm, and a second end;
    a first fastener attached to a first portion of the strap; and
    a second fastener attached to a second portion of the strap and configured to mate with the first fastener; wherein the strap is configured to be placed in a folded state in which the first portion of the strap spans the space between the first and second arms, and the strap wraps around the first arm so that the second portion of the strap folds back, and over the first portion to place the second fastener in contact with the first fastener.

* * * * *